United States Patent
Lee

(10) Patent No.: US 12,153,627 B1
(45) Date of Patent: Nov. 26, 2024

(54) METHOD FOR SEARCHING VIDEO BASED ON VIDEO SEGMENTATION

(71) Applicant: ActionPower Corp., Seoul (KR)

(72) Inventor: Jingu Lee, Seoul (KR)

(73) Assignee: Action Power Corp., Seoul (KR)

( * ) Notice: Subject to any disclaimer, the term of this patent is extended or adjusted under 35 U.S.C. 154(b) by 0 days.

(21) Appl. No.: 18/653,779

(22) Filed: May 2, 2024

(30) Foreign Application Priority Data

May 4, 2023 (KR) .................. 10-2023-0058130

(51) Int. Cl.
*G06F 16/70* (2019.01)
*G06F 16/71* (2019.01)
*G06F 16/783* (2019.01)

(52) U.S. Cl.
CPC .......... *G06F 16/783* (2019.01); *G06F 16/71* (2019.01)

(58) Field of Classification Search
CPC .............................. G06F 16/71; G06F 16/783
See application file for complete search history.

(56) References Cited

U.S. PATENT DOCUMENTS

| 10,824,874 | B2 | 11/2020 | Zheng et al. | |
| 11,238,093 | B2 | 2/2022 | Ayush et al. | |
| 11,720,750 | B1 | 8/2023 | Kim et al. | |
| 11,758,233 | B1* | 9/2023 | Gu | G06N 20/00 |
| | | | | 715/721 |
| 2023/0306056 | A1* | 9/2023 | Lee | G06F 16/783 |

FOREIGN PATENT DOCUMENTS

| CN | 112989117 A | 6/2021 |
| KR | 10-1940289 B1 | 10/2018 |
| KR | 10-2018295 B1 | 12/2018 |
| KR | 10-2019-0118904 A | 10/2019 |
| KR | 10-2070197 B1 | 10/2019 |
| KR | 10-2148392 B1 | 5/2020 |
| KR | 10-2021-0047583 A | 4/2021 |

(Continued)

OTHER PUBLICATIONS

Chen et al., Shot Contrastive Self-Supervised Learning for Scene Boundary Detection, 2021 IEEE/CVF Conference on Computer Vision and Pattern Recognition (CVPR). 2021 [retrieved Sep. 25, 2024]. Retrieved from the Internet: https://ieeexplore.ieee.org/stamp/stamp.jsp?arnumber=9578094 (Year: 2021).*

(Continued)

*Primary Examiner* — Kristopher Andersen
(74) *Attorney, Agent, or Firm* — Seed IP Law Group LLP

(57) ABSTRACT

Disclosed is a method for constructing a database using a video, which is performed by a computing device. The method may include acquiring the video. The method may include extracting a representation of an image with respect to each frame of the acquired video. The method may include extracting a representation of a text with respect to each frame of the acquired video. The method may include determining a primary frame among the frames of the acquired video based on the representations of the images and the representations of the texts of the frames of the acquired video. The method may include generating a database for representations associated with the determined primary frame.

14 Claims, 17 Drawing Sheets

(56) References Cited

FOREIGN PATENT DOCUMENTS

| | | |
|---|---|---|
| KR | 10-2243922 B1 | 4/2021 |
| KR | 10-2021-0134866 A | 11/2021 |
| KR | 10-2413514 B1 | 4/2022 |
| KR | 10-2394756 B1 | 5/2022 |
| KR | 10-2476499 B1 | 12/2022 |
| KR | 10-2492277 B1 | 1/2023 |
| KR | 10-2023-0016537 A | 2/2023 |

OTHER PUBLICATIONS

"Images and voice can also be left to us: Evolving language models," *Nikkei Computer* 1078:034-037, Sep. 29, 2022. (13 pages).

\* cited by examiner

METHOD FOR SEARCHING VIDEO BASED ON VIDEO SEGMENTATION

CROSS-REFERENCE TO RELATED APPLICATIONS

This application claims priority to and the benefit of Korean Patent Application No. 10-2023-0058130 filed in the Korean Intellectual Property Office on May 4, 2023, the entire contents of which are incorporated herein by reference.

BACKGROUND

Technical Field

The present disclosure relates to a method for segmenting a video, and more particularly, to a technology for determining a primary point of a video, and thus segmenting the video.

Description of the Related Art

There is a limit to simply searching video only with text. In addition, it is not suitable that a method for searching an image with the text is used for a method for searching a video which is a set of serial images as it is. For reference, when an existing mode of comparing a similarity in representation vector between the image and the text is used, the similarity between the image and the text can be obtained, but in the case of a video, the image includes a time sequence, so an accurate time in the image cannot be searched, and there is a problem in that it is difficult to obtain the similarity between the text and the image.

For example, when the image is searched using the text on the portal site, the result is relatively accurate than a result of searching the video. In other words, the image search using the text is good, but there is a limit that the video searching is not relatively good. When the video is searched by the existing image-text searching method, the video is generally 60 fps, so even if there is only a one-hour image, representation vectors for 60*60*60 (216,000) images, and a representation vector of a search text should be compared. In this case, exorbitant amounts of resources are required, and a long search time is required. Another example, when lectures are taken on the Internet, a user can perform a search for "LaGrange conversion" on a specific site (e.g., the university public lecture homepage) when the user wants to search a part describing the "LaGrange conversion." As a search result when the "LaGrange conversion" is searched, multiple lecture contents are shown, and it is difficult for the user to identify which content among multiple contents is a content desired thereby, so the user should view all lectures or find a detailed title, and even though the user views a detailed lecture list, there is a problem in that the user cannot know a content including an actual search result.

That is, even when the user performs a search using the text in portal sites (e.g., YouTube and Google) in order to find an image describing specific contents, it is very difficult to find an appropriate result for a desired image.

Korean Patent Registration No. 10-1940289 (Jan. 14, 2019) discloses a video search system based on information.

BRIEF SUMMARY

The present disclosure has been made in an effort to provide a method for constructing a database using a video. For example, the present disclosure has been made in an effort to provide a method for determining a primary frame by extracting representations of an image and a text for each frame of a video, and generating a database for representations associated with the determined primary frame.

Meanwhile, a technical object to be achieved by the present disclosure is not limited to the above-mentioned technical object, and various technical objects can be included within the scope which is apparent to those skilled in the art from contents to be described below.

An exemplary embodiment of the present disclosure provides a method for constructing a database using a video, which is performed by a computing device. The method may include: acquiring the video; extracting a representation of an image with respect to each frame of the acquired video; extracting a representation of a text with respect to each frame of the acquired video; determining a primary frame among the frames of the acquired video based on the representations of the image and the representations of the text of the frames of the acquired video; and generating a database for representations associated with the determined primary frame.

In an exemplary embodiment, at least one of a model for extracting the representation of the image or a model for extracting the representation of the text may be a model trained based on image-text contrastive training.

In an exemplary embodiment, the method may further include generating STT text information by performing STT in an interval between multiple primary frames determined with respect to the acquired video; and extracting a representation for the STT text information.

In an exemplary embodiment, the database for the representations associated with the determined primary frame may include representations of images and representations of texts extracted with respect to respective primary frames, and a representation extracted with respect to STT text information generated in an interval between the multiple primary frames.

In an exemplary embodiment, the generating of the database for the representations associated with the determined primary frame may include determining the representation extracted with respect to the STT text information generated in the interval between the multiple primary frames as a representation associated with a primary frame temporally preceded among the multiple primary frames.

In an exemplary embodiment, the database for the representations associated with the determined primary frame may include representations associated with a first primary frame, and representations associated with a second primary frame after the first primary frame, and the representations associated with the first primary frame may include a representation of a text extracted with respect to the first primary frame, a representation of an image extracted with respect to the first primary frame, and a representation for STT text information extracted with respect to an interval between the first primary frame and the second primary frame.

In an exemplary embodiment, the method may further include generating a final search database based on the database for the representations associated with the determined primary frame.

In an exemplary embodiment, the final search database may include metadata including the video related information, a representation of an image representing static image information included in the primary frame, a representation of a text representing static text information included in the primary frame, and a representation for STT text information including dynamic information for an interval between the primary frames.

In an exemplary embodiment, the extracting of the representation of the text with respect to each frame of the acquired video may include extracting the representation of the text based on at least one of subtitle information for each frame or text information acquired by OCR for the image of each frame.

In an exemplary embodiment, each frame of the acquired video may be represented as the static representation vector including the image representation and the text representation, and the determining of the primary frame among the frames of the acquired video may include determining, based on calculation of similarities between static representation vectors of one or more primary frames most recently determined according to a flow of time, and a static representation vector of a candidate frame, the candidate frame as the primary frame.

Another exemplary embodiment of the present disclosure provides a video search method performed by a computing device. The method may include: acquiring search information for a video; extracting a representation for the search information; and determining the primary frame associated with the search information based on a comparison between the representation extracted for the search information and representations of multiple primary frames determined for the video, and the representations of the respective primary frames may include a representation extracted with respect to an image of each primary frame, and a representation extracted with respect to a text of each primary frame.

In an exemplary embodiment, the representations of the respective primary frames may further include representations for STT text information associated with the respective primary frames.

In an exemplary embodiment, the representation of the STT text information associated with the respective primary frames may include a representation of STT text information for an interval between each primary frame and the next primary frame.

In an exemplary embodiment, the method may further include providing information on the primary frame associated with the search information, and the information on the primary frame associated with the search information may include video information corresponding to an interval between the associated primary frame and a next primary frame of the associated primary frame.

In an exemplary embodiment, the providing of the information on the primary frame associated with the search information may further include providing a timestamp corresponding to the search information based on the STT text information.

Yet another exemplary embodiment of the present disclosure provides a method for summarizing a video, which is performed by a computing device. The method may include: acquiring the video; extracting a representation of an image with respect to each frame of the acquired video; extracting a representation of a text with respect to each frame of the acquired video; determining a primary frame among the frames of the acquired video based on the representations of the image and the representations of the text of the frames of the acquired video; and generating summary information of the video based on the representations associated with the determined primary frame.

Still yet another exemplary embodiment of the present disclosure provides a computer program stored in a computer-readable storage medium. When the computer program is executed by one or more processors, the computer program may allow the one or more processor to the following operations for constructing a database using a video, and the operations may include: an operation of acquiring the video; an operation of extracting a representation of an image with respect to each frame of the acquired video; an operation of extracting a representation of a text with respect to each frame of the acquired video; an operation of determining a primary frame among the frames of the acquired video based on the representations of the image and the representations of the text of the frames of the acquired video; and an operation of generating a database for representations associated with the determined primary frame.

In an exemplary embodiment, the operations may further include an operation of generating STT text information by performing STT in an interval between multiple primary frames determined with respect to the acquired video; and an operation of extracting a representation for the STT text information.

In an exemplary embodiment, the database for the representations associated with the determined primary frame may include representations of images and representations of texts extracted with respect to respective primary frames, and a representation extracted with respect to STT text information generated in an interval between the multiple primary frames.

In an exemplary embodiment, the operations may further include an operation of generating a final search database based on the database for the representations associated with the determined primary frame.

In an exemplary embodiment, the operation of extracting the representation of the text with respect to each frame of the acquired video may include an operation of extracting the representation of the text based on at least one of subtitle information for each frame or text information acquired by OCR for the image of each frame.

In an exemplary embodiment, each frame of the acquired video may be represented as the static representation vector including the image representation and the text representation, and the operation of determining the primary frame among the frames of the acquired video may include an operation of determining, based on calculation of similarities between static representation vectors of one or more primary frames most recently determined according to a flow of time, and a static representation vector of a candidate frame, the candidate frame as the primary frame.

Still yet another exemplary embodiment of the present disclosure provides a computing device. The device may include: at least one processor; and a memory, and at least one processor may be configured to acquire a video, extract a representation of an image with respect to each frame of the acquired video, extract a representation of a text with respect to each frame of the acquired video, determine a primary frame among the frames of the acquired video based on the representations of the image and the representations of the text of the frames of the acquired video, and generate a database for representations associated with the determined primary frame.

In an exemplary embodiment, at least one processor may be additionally configured to generate STT text information by performing STT in an interval between multiple primary frames determined with respect to the acquired video, and extract a representation for the STT text information.

In an exemplary embodiment, the database for the representations associated with the determined primary frame may include representations of images and representations of texts extracted with respect to respective primary frames, and a representation extracted with respect to STT text information generated in an interval between the multiple primary frames.

In an exemplary embodiment, at least one processor may be additionally configured to generate a final search database based on the database for the representations associated with the determined primary frame.

In an exemplary embodiment, at least one processor may be configured to extract the representation of the text based on at least one of subtitle information for each frame or text information acquired by OCR for the image of each frame.

In an exemplary embodiment, each frame of the acquired video is represented as the static representation vector including the image representation and the text representation, and at least one processor may be configured to determine, based on calculation of similarities between static representation vectors of one or more primary frames most recently determined according to a flow of time, and a static representation vector of a candidate frame, the candidate frame as the primary frame.

According to an exemplary embodiment of the present disclosure, there is an effect in that a search performance of a video can be significantly enhanced. Further, according to an exemplary embodiment of the present disclosure, a part related to a search text is accurately searched in one long image content to further shorten a search time of a user. In addition, according to an exemplary embodiment of the present disclosure, a database for representations associated with a determined primary frame is constructed to establish a relationship between the text and the video, which is not present in the related art, and as a result, the video can be more easily and accurately searched.

Further, according to an exemplary embodiment of the present disclosure, an interval (e.g., an interval between the 'corresponding primary frame and a next primary frame') corresponding to the primary frame is determined, and then a pinpoint result is provided according to an STT result of the corresponding interval, so all images are not compared in the process of performing the video search, thereby reducing resources.

Meanwhile, the effects of the present disclosure are not limited to the above-mentioned effects, and various effects can be included within the scope which is apparent to those skilled in the art from contents to be described below.

DETAILED DESCRIPTION

Figure 1:
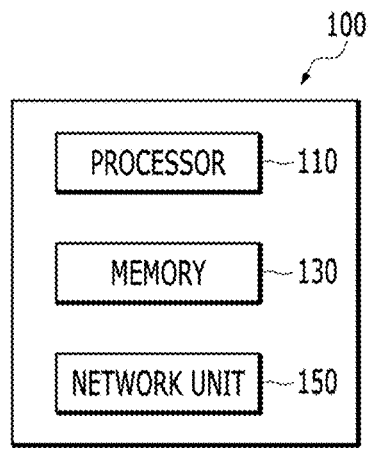
FIG. 1 is a block diagram of a computing device according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component," "module," "system," and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A," "a case including only B," and "a case in which A and B are combined."

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 150 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The network unit 150 according to an exemplary embodiment of the present disclosure may use an arbitrary type known wired/wireless communication systems.

Figure 2:
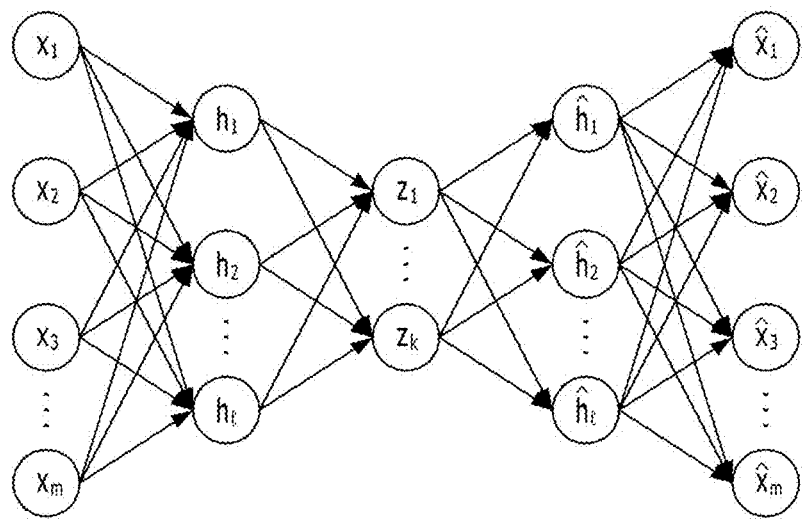
FIG. 2 is a conceptual view illustrating a neural network according to an exemplary embodiment of the present disclosure.

FIG. 2 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (i.e., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the training data may be generally a subset of actual data (i.e., data to be processed using the learned neural network), and as a result, there may be a learning cycle in which errors for the training data decrease, but the errors for the actual data increase. Overfitting is a phenomenon in which the errors for the actual data increase due to excessive learning of the training data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of learning, utilization of a batch normalization layer, etc., may be applied.

Figure 3A:
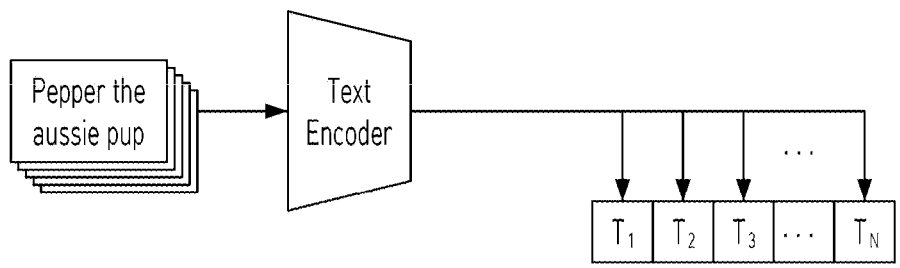
FIGS. 3A and 3B are diagrams describing an image-text contrastive trained method according to an exemplary embodiment of the present disclosure.
Figure 3B:
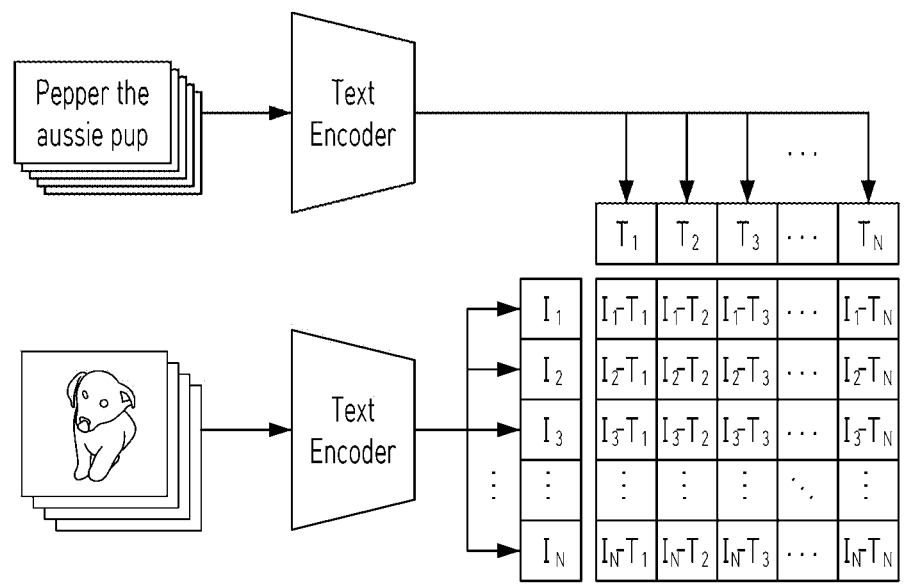
Figure 4:
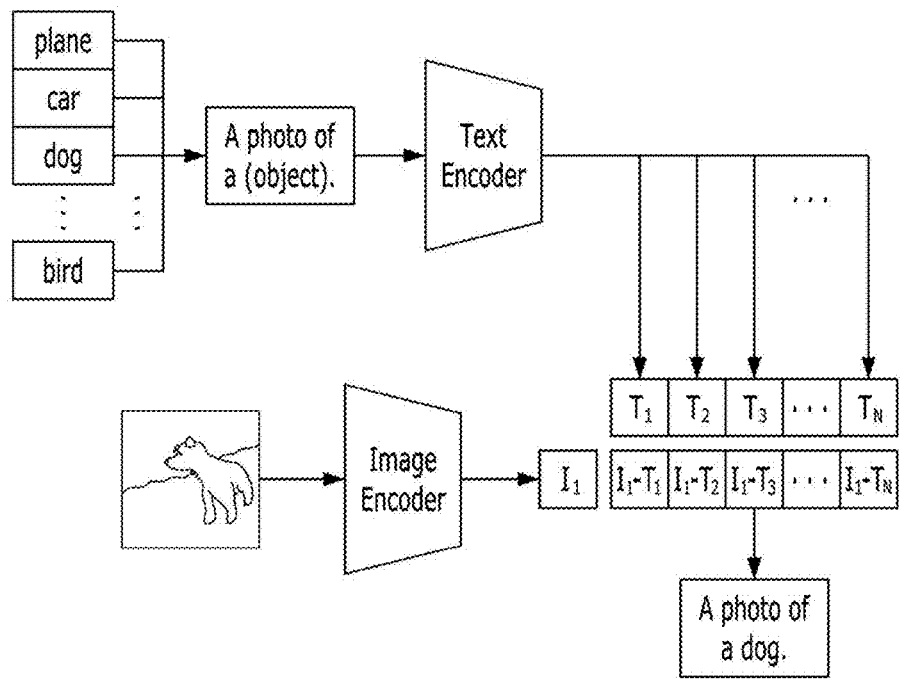
FIG. 4 is a diagram describing an operation of finding an image-text similarity using an image-text contrastive trained model according to an exemplary embodiment of the present disclosure.
Figure 5A:
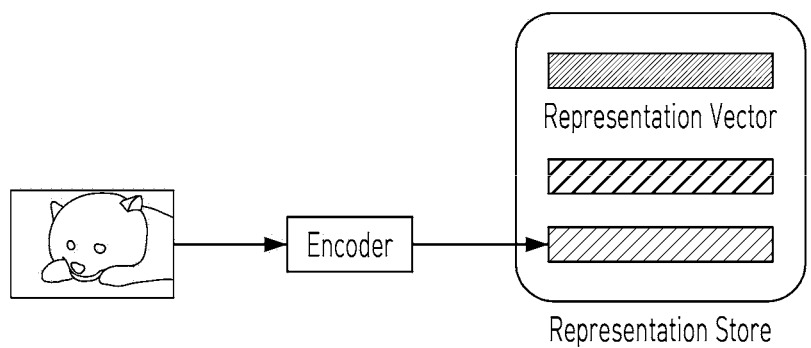
FIGS. 5A, 5B, and 5C are diagrams describing an operation of searching an image corresponding to a text or an image using the image-text contrastive trained model according to an exemplary embodiment of the present disclosure.
Figure 5B:
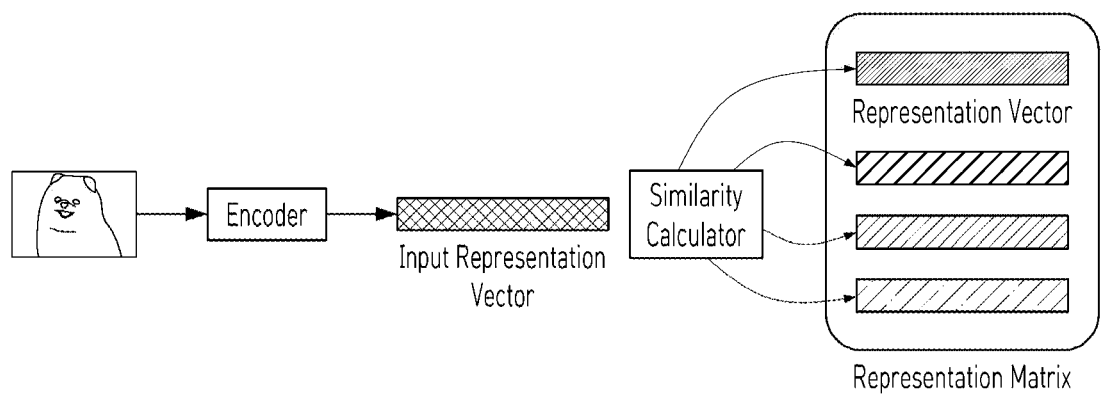
Figure 5C:
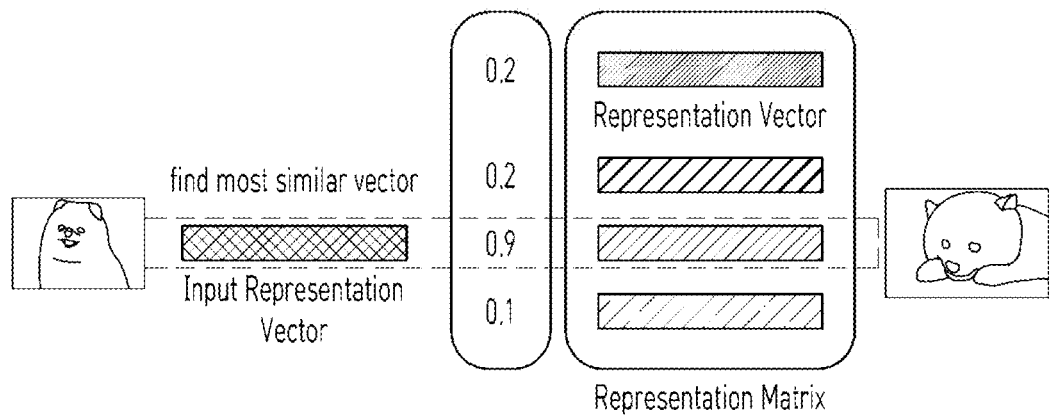

FIGS. 3A and 3B are diagrams for describing an image-text contrastive trained method according to an exemplary embodiment of the present disclosure, FIG. 4 is a diagram describing an operation of finding an image-text similarity using an image-text contrastive trained model according to an exemplary embodiment of the present disclosure, and FIGS. 5A, 5B, and 5C are diagrams describing an operation of searching an image corresponding to a text or an image using the image-text contrastive trained model according to an exemplary embodiment of the present disclosure.

According to an exemplary embodiment of the present disclosure, video segmentation or video timestamping described below is a technology that segments a video according to a main scene. Based on this, there is a technology of searching the video, but now the video may be simply searched using only a text. As an example, the video may also be searched based on a method for searching the text with the image or a method for finding an image similar to an input image using a representation (for example, a representation vector used upon image-text contrastive trained) described below. As an image-text contrastive trained model, there is most representatively contrastive language-image pretraining (CLIP).

According to an exemplary embodiment of the present disclosure, the image-text contrastive trained may be training using a representation. The image-text contrastive trained may include 1) a step of training a model based on representation map generation, 2) a step of searching a text corresponding to an image using a representation map, and 3) a step of searching an image corresponding to a text or image using the representation map. For reference, the representation map means a result of converting raw data into a vector, a matrix, or a tensor of a specific dimension using a filter, an encoder, or a model.

First, 1) the step of training the model based on the representation map generation is to be described through FIGS. 3A and 3B. FIG. 3A illustrates a process of converting the text into the tensor (representation map) using the encoder. In FIG. 3A, $T_1$ which represents a result of converting first raw text data ("Pepper the Aussie pup") may be represented as the vector, the matrix, the tensor, etc. As in FIG. 3A, a representation of $T_1$ to $T_N$ N data is referred to as an N-dimensional representation map. Further, contrastive trained is a method for training the model according to a similarity between a representation map of the text and a representation map of the image. For example, in FIG. 3B, pairs having a highest relation among N texts and N images may be disposed as the same reference numeral ($T_1$–$I_1$, $T_2$–$I_2$, . . . , $T_N$–$I_N$), and the model may be trained in which texts or images (representatively, $T_1$ and $I_1$, $T_2$ and $I_2$, . . . , $T_N$ and $I_N$) of which reference numerals are close have a high similarity. As an example, since $T_1$ represents a text "Pepper the Aussie pup," $I_1$ represents an image corresponding to "Pepper the Aussie pup," a text "The photo of the Pepper the Aussie pup" is similar to $T_1$, the text is assigned with reference numeral 2, and when the text is a text corresponding to $T_2$, it may be trained that a $T_1$–$I_1$ similarity is very high and a $T_2$–$I_1$ similarity may also be significantly high. In a method for calculating the similarity, a cosine similarity may be used. The model may be trained so that a similarity between representations of an image and a text having a highest relation is high and a similarity between representations of an image and a text having a low relation is low according to a result of the cosine similarity. For reference, a cosine similarity equation may be represented in as in Equation 1.

$$\text{similarity} = \cos(\theta) = \frac{A \cdot B}{\|A\| \|B\|} = \frac{\sum_{i=1}^{n} A_i \times B_i}{\sqrt{\sum_{i=1}^{n} (A_i)^2} \times \sqrt{\sum_{i=1}^{n} (B_i)^2}} \quad \text{[Equation 1]}$$

Next, 2) the step of searching the text corresponding to the image using the representation map is to be described through FIG. 4. FIG. 4 is a diagram describing a method for finding an image-text similarity using an image-text contrastive trained model. The step of searching the text corresponding to the image using the representation map may be performed by a mode of converting a view text (plane, car, dog, . . . , bird) into a representation vector, and converting an input image into a representation vector, and comparing both converted representation vectors with each other to find a text closest (having a highest relation) to the image.

Next, 3) the step of searching the image corresponding to the text or the image using the representation map is to be described through FIGS. 5A, 5B, and 5C. FIG. 5A illustrates a method for constructing a contrastively learned representation DB with a possessed (prestored) image as described above with reference to FIGS. 3A and 3B, FIG. 5B illustrates a method for comparing a similarity between an input image and a representation DB, and FIG. 5C illustrates a method for providing an image having a highest similarity. For reference, in the step of searching corresponding to the text or the image using the representation map, possessed images are converted into representations, and stored (for example, converted into the representation vector, and stored by using the image-text contrastive trained model described above by referring to FIGS. 3A and 3B), and when an image is input, the input image is converted (for example, converted into the representation vector using the image-text contrastive trained model described above by referring to FIGS. 3A and 3B), and both representation vectors are compared with each other to find an image close to the input image.

For convenience of description, in FIGS. 5A, 5B, and 5C, only a case where the type of input data is the image is described, but even when the text is input, an operation is similar. As an example, hereinafter, a process of searching an image having a highest similarity when an input text "puppy" is input will be described in brief. In step (a), already possessed images are converted into the representation vector to construct the representation DB. In step (b), the input text "puppy" may be converted into the representation vector by using a model which is the same as the model (e.g., the image-text contrastive trained model such as CLIP) used when converting the images into the representation vector in step (a). In step (c), the representation vector into which "puppy" is converted is compared with the representation DB in step (a) to output an image having a highest similarity as a final result.

The contrastive language-image pretrained (CLIP) model which is the image-text contrastive trained model has all image-text information, but not the representation extraction method by the model but a general representation (feature) extraction method has a problem in that performance deteriorates when searching the image with the text. As an example, there is no information on a related text in an image representation extraction process by a general model, and there is no information on a related image in a text representation extraction process. Accordingly, in an image search method through a general text, since the search is performed only by a similarity between a text (e.g., a text in image information, text information for an object or a person in the image, etc.) describing the image and a search text, there is a problem in that the search performance significantly deteriorates. That is, according to the model other than the image-text contrastive trained model, the performance deteriorates upon searching the image with the text, and of course, a video search performance also significantly deteriorates.

Further, as another problem, even though the model such as the image-text contrastive trained CLIP is used, the performance of the model deteriorates when "video" which is serial images including a time-serial sequence is searched. In the present disclosure, in order to solve such a problem, the text or image representation may be extracted based on a model pretrained (e.g., CLIP) by image-text contrastive training, and the video may be searched based on the extracted representation. Hereinafter, this will be described in more detail through FIGS. 7 to 10.

According to an exemplary embodiment of the present disclosure, speech recognition (STT or ASR; Speech To Text, or Automatic Speech Recognition) is a dictation technology that converts speech into text. In other words, the STT is a technology that generates text (according to spelling) corresponding to the speech. An input of this STT may include at least one of a speech signal, a spectrogram converted from the speech signal, or a speech feature. Additionally, an output of the STT is text in the form of a character string. Meanwhile, the STT model may be implemented in various types of models, including a neural network model. Further, the STT models may be divided into a modularized scheme and a non-modularized end-to-end (e2e) scheme depending on an implemented scheme. Here, the modularized scheme may include an acoustic model (a model that indicates what form the speech signal may be expressed in), a language model (a model that assigns a generation probability in words based on given sentences and words), and a traditional model that perform speech recognition separately by a pronunciation lexicon (for example, some models of Kaldi toolkit-based ASR models, Hybrid-ASR models, etc.), but is not limited thereto. On the contrary, the non-modularized scheme mainly refer to e2e models (e.g., transformer-based encoder decoder models, etc.), and models may be generated by training a lot of data without providing sub-modules. Meanwhile, a beam search technique is a representative decoding technique, and the beam search technique is a method that does not predict only one word that is closest to a ground truth depending on a situation, but finds a most optimal ground truth by considering an entire sentence by opening up various possibilities.

The present disclosure is a method for segmenting a video. Specifically, the present disclosure relates to a method for determining a primary point of the video using a text representation, an image representation, and an STT text representation, and thus segmenting the video and thus segmenting the video.

Further, in the present disclosure, the primary frame may be determined by using static image information and static text information for each frame, and STT text information may be extracted by performing STT for an interval between primary frames. Through such a process, in the present disclosure, static image representation information and static text representation information for each primary frame, and STT text representation information for an interval up to a next primary frame may be determined, and meta information such as a video title is added to the information to construct a representation database (DB) for videos. As a result, when the search is performed by extracting a representation vector for an input text and comparing a similarity between the extracted representation vector and the representation database (DB) when searching the video, a more accurate video search considering detailed contents in the image may be performed.

In other words, the present disclosure is characterized in that the primary frame is determined by calculating changes of the representation vectors of the image and the text for each frame, and representations extracted from an STT result text for intervals divided by the primary frames and the metadata of the image are combined to construct a representation DB for images.

Figure 6:
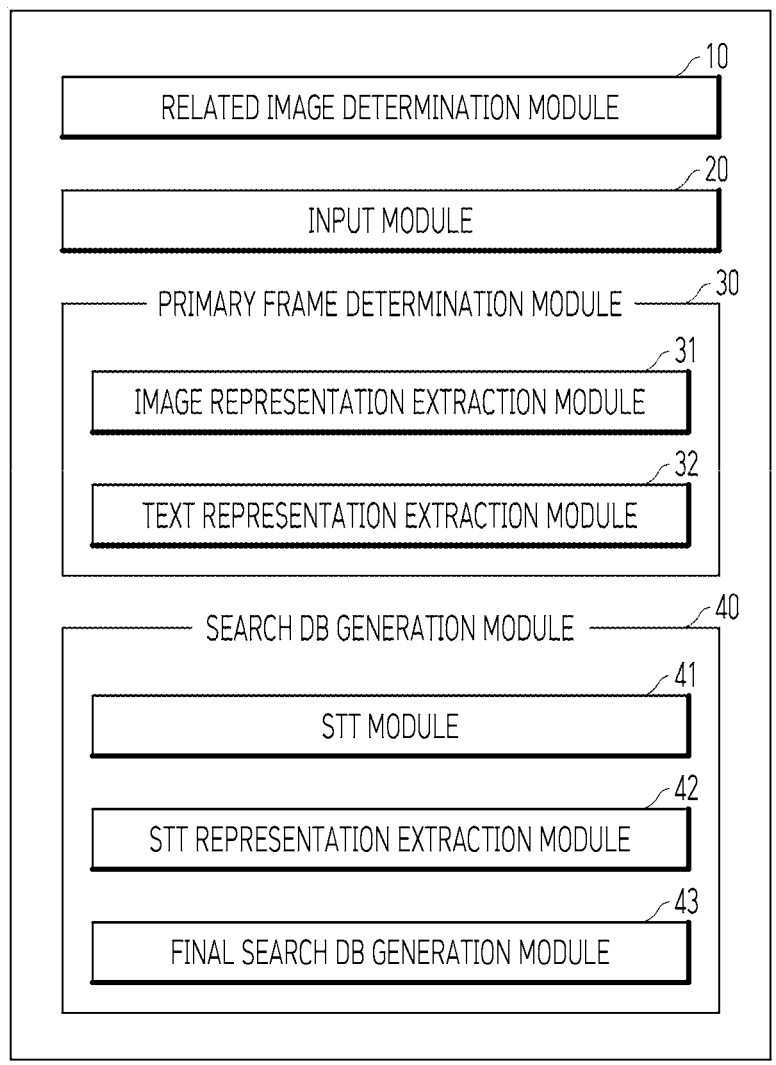
FIG. 6 is a block diagram illustrating multiple modules for constructing a database using a video according to an exemplary embodiment of the present disclosure.

FIG. 6 is a block diagram illustrating multiple modules for constructing a database using a video according to an exemplary embodiment of the present disclosure.

Referring to FIG. 6, according to an exemplary embodiment of the present disclosure, a computing device 100 may include a related image determination module 10, an input module 20, a primary frame determination module 30, and a search DB generation module 40. Meanwhile, multiple modules that may be included in the computing device 100 may be controlled by the processor 110 or implemented by an operation of the processor 110. Additionally, in order to construct a database using a video, modules that may be included in the computing device 100 are not limited to the multiple modules described above, and may include additional modules. Hereinafter, exemplary multiple modules for constructing the database using the video will be described in more detail.

For reference, "representation" mentioned below means "representative vector" extracted through a module which may extract a feature for the representation, such as an encoder, etc. That is, a static representation DB or a final search database store a series of vectors.

According to an exemplary embodiment of the present disclosure, the related image determination module 10 may determine images related to a search text. For the search text related image, a method similar to the existing video search method may be used. For example, images (hereinafter, referred to as "related image(s)") related to a text searched by the user may be determined through a keyword or metadata based text based search. The related image determination module 10 may directly perform a process of determining the related image, but the present disclosure is not limited thereto, and may determine the related image through a third party such as YouTube or Google. Further, in some exemplary embodiments, the related image may be predetermined, and input into an input module 20 below. For example, when the related image determination module 10 is used in B2B, while a customer determines all lecture images possessed thereby as the related image, and delivers the lecture images to the related image determination module 10 through a customer terminal, and inputs the images into the input module 20 below, a representation DB of the related images may also be constructed.

According to an exemplary embodiment of the present disclosure, the input module 20 may receive the related images determined by the related image determination module 10. As an example, the related images are segmented into multiple frames, and the input module 20 may extract an audio (e.g., a speech signal or spectrogram) to perform STT for each image. Further, the input module 20 may extract various metadata associated for each image. As an example, the metadata may include time information, a video, URL, a video length, a video title, a video extension, summary information, a video provider (e.g., in the case of a YouTube image, information related to an account of uploading the image), etc.

According to an exemplary embodiment of the present disclosure, the primary frame determination module 30 may i) extract a representation of an image for each frame of the acquired video. Further, the primary frame determination module 30 may ii) extract a representation of a text for each frame of the acquired video. Further, the primary frame determination module 30 may iii) determine the primary frame among the frames of the acquired video based on representations of the images and representations of the texts of the frames of the acquired video.

For reference, at least one of a model for extracting the representation of the image or a model for extracting the representation of the text may be a model trained based on image-text contrastive training. The model trained based on the image-text contrastive training is a model contrastively trained with large-scale data in advance with respect to an image-text similarity. That is, the model for extracting the image representation is in a state of already learning information on the text related to the image. Similarly, the model for extracting the text representation is in a state of already learning information on the image related to the text. As an example, only when extracting the image representation, the contrastive language-image pretraining (CLIP) may be used, but even when extracting the text representation, the contrastive language-image pretraining (CLIP) may be used after text recognition (OCR) for the frames of the related image. Accordingly, the related image or the related text may be better searched when searching the text. Further, the image representation is a vector which the model trained based on the image-text contrastive training outputs by receiving the image as an input, and the text representation is a vector which the model trained based on the image-text contrastive training outputs by receiving the text as the input.

According to an exemplary embodiment, the primary frame determination module 30 may include an image representation extraction module 31 for extracting the representation of the image. The image representation extraction module 31 may extract the representation of the image for each frame of the acquired video. For example, the image representation extraction module 31 may be a filter, an encoder, or a network model, and may extract a vector, a matrix, or a tensor of a specific dimension. As an example, the image representation extraction module 31 may include Vision Transformers (ViT), ResNet, Contrastive Language-Image Pretraining (CLIP), etc. For reference, the image representation may include information on various patterns related to the image, such as color information, figure information, object information, etc., of an image corresponding to the frame.

Next, according to an exemplary embodiment, the primary frame determination module 30 may include a text representation extraction module 32 for extracting the representation of the text. The text representation extraction module 32 may extract the representation of the text for each frame of the acquired video. For example, the text representation extraction module 32 may be the filter, the encoder, or the network model, and may extract a vector, a matrix, or a tensor of a specific dimension. Further, the text representation extraction module 32 may include CLIP, an OCR model, an NLP model, or a transformer encoder. For reference, the text representation may include information on various patterns related to the text, such as meaning information of the text corresponding to the frame. Further, the text representation extraction module 32 may also extract the representation of the text based on at least one of subtitle information for each frame or text information acquired by OCR for the image of each frame.

Figure 7:
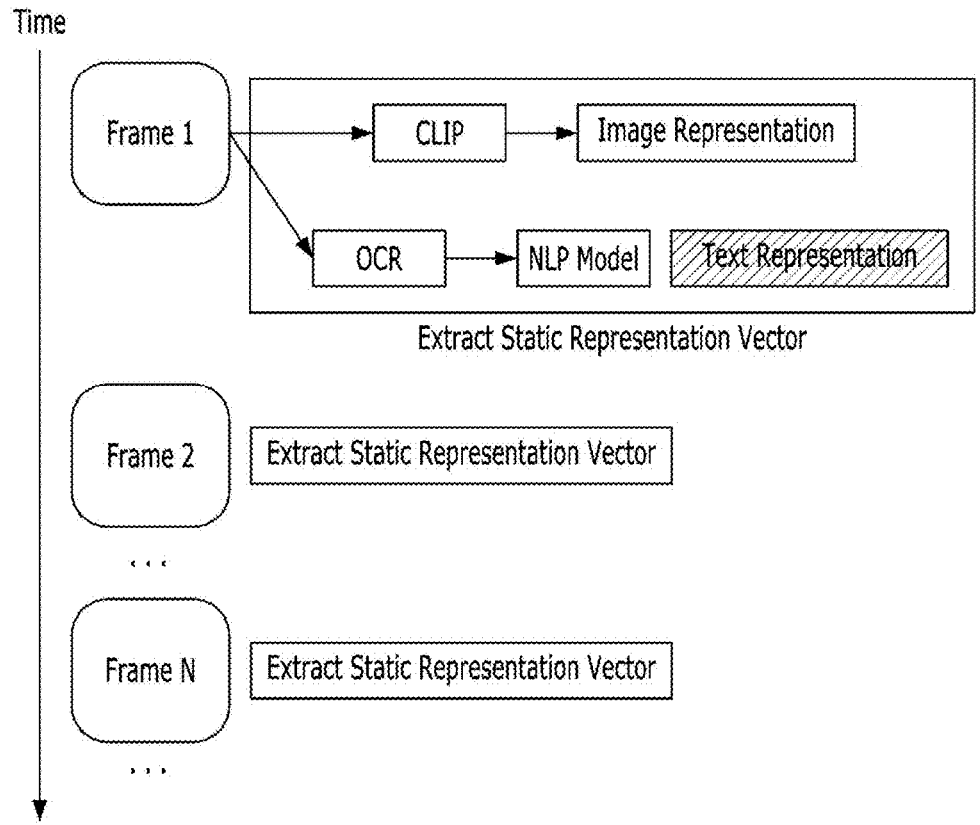
FIG. 7 is a diagram schematically illustrating an operation of extracting image and text representations for each frame in the video according to an exemplary embodiment of the present disclosure.

FIG. 7 is a diagram schematically illustrating an operation of extracting image and text representations for each frame in the video according to an exemplary embodiment of the present disclosure.

For example, referring to FIG. 7, the image representation extraction module 31 may extract a representation of an image with respect to respective frames (e.g., Frame 1, Frame 2, . . . , Frame N) of a video. Further, the text representation extraction module 32 may extract a representation of a text with respect to respective frames (e.g., Frame 1, Frame 2, . . . , Frame N) of a video. Since the video is data in which frames images are continued, a "static representation vector" constituted by the image representation and the text representation may be generated every respective frame images. The "static representation vector" may be constituted by static information (e.g., the image representation and the text representation) acquired by respective frames themselves. As an example, when the video is 60 frame per see (fps) and is a one-hour image, a static representation vector corresponding to 60*60*60 frames may be generated.

According to an exemplary embodiment, the primary frame determination module 30 may iii) determine the primary frame among the frames of the acquired video based on representations of the images and representations of the texts of the frames of the acquired video. Here, each frame of the acquired video may be represented as the static representation vector including the image representation and the text representation.

Further, the primary frame determination module 30 may determine, based on calculation of similarities between static representation vectors of one or more primary frames most recently determined according to a flow of time, and a static representation vector of a candidate frame, the candidate frame as the primary frame. For example, when the static representation vector is significantly changed by comparing the static representation vectors of one or more primary frames most recently determined according to the flow of time and the static representation vector of the candidate frame, the primary frame determination module 30 determines and stores the candidate frame as the primary frame to generate a static representation DB for representations associated with the primary frame. As an example, the primary frame determination module 30 may determine whether the static representation vector is significantly changed by calculating a similarity score, and in a method for calculating the similarity score, the cosine similarity (see Equation 1) may be used, but the present disclosure is not limited thereto.

Figure 8:
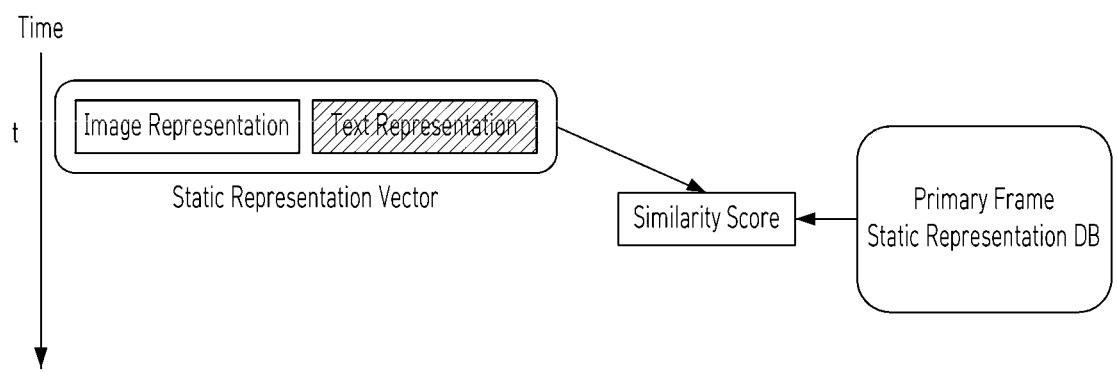
FIG. 8 is a diagram schematically illustrating an operation of comparing a static representation vector of a frame of a time t and recent static representation vectors among primary frames stored in a primary frame static representation database according to an exemplary embodiment of the present disclosure.
Figure 9:
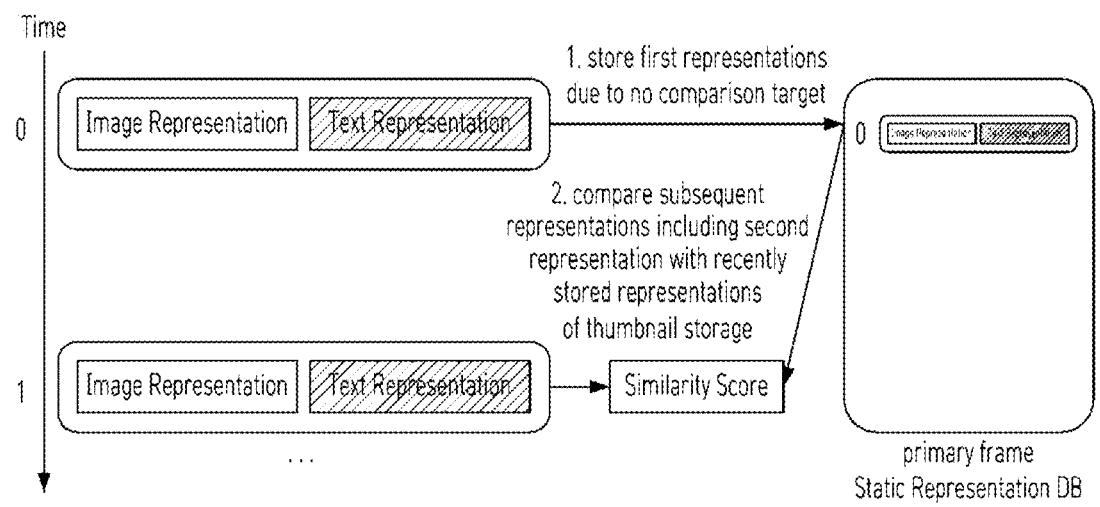
FIG. 9 is a diagram schematically illustrating a storage operation of static representation vectors of a first frame and a second frame according to an exemplary embodiment of the present disclosure.
Figure 10:
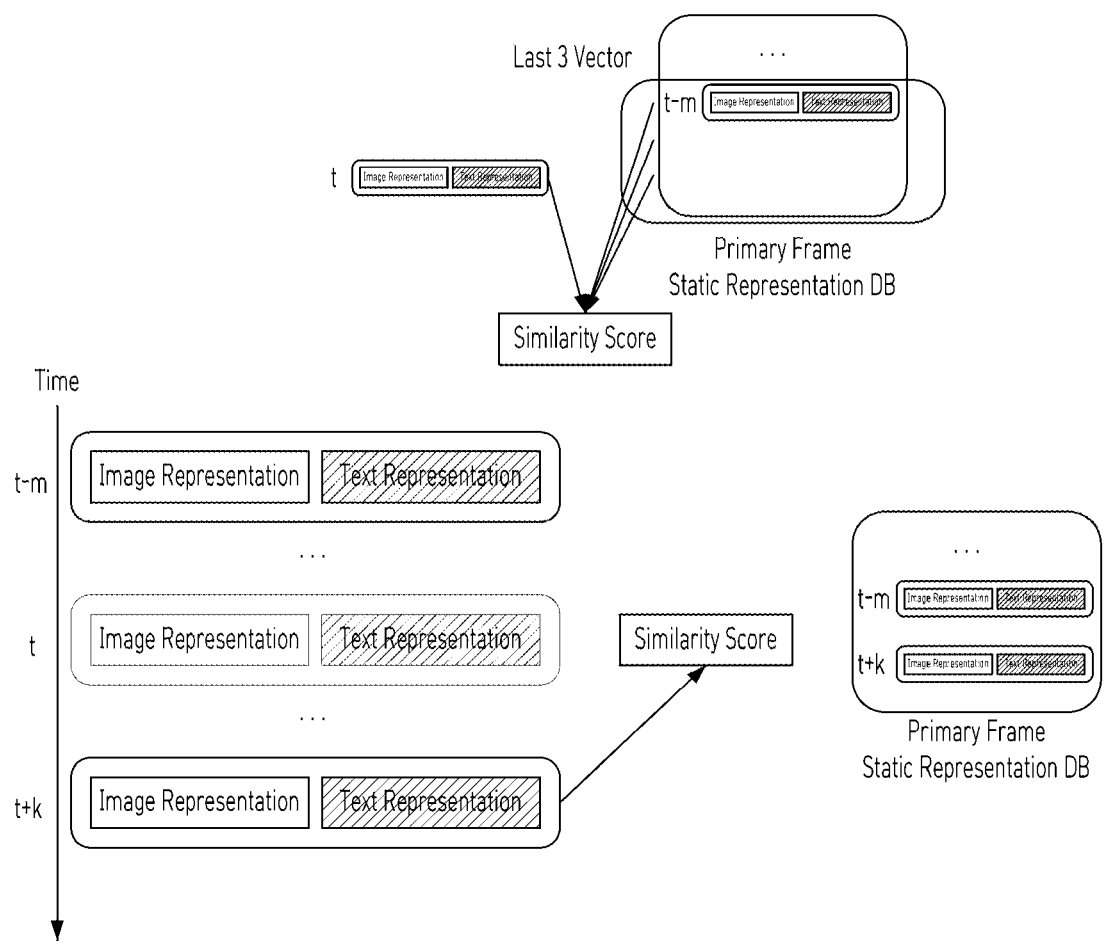
FIG. 10 is a diagram schematically illustrating an operation of determining a primary frame among frames of time t−m to t+k according to an exemplary embodiment of the present disclosure.

FIG. 8 is a diagram schematically illustrating an operation of comparing a static representation vector of A frame of a time t and recent static representation vectors among primary frames stored in a primary frame static representation database according to an exemplary embodiment of the present disclosure, FIG. 9 is a diagram schematically illustrating a storage operation of static representation vectors of a first frame and a second frame according to an exemplary embodiment of the present disclosure, and FIG. 10 is a diagram schematically illustrating an operation of determining a primary frame among frames of time t−m to t+k according to an exemplary embodiment of the present disclosure.

For example, referring to FIG. 8, the primary frame determination module 30 may compare recent (e.g., three frames) static representation vectors among the primary frames stored in the static representation DB for a static representation vector of a frame of a time t and representations associated with the primary frame.

More specifically, referring to FIG. 9, the primary frame determination module 30 may store a static representation vector of a first frame in "the static representation DB for the representations associated with the primary frame" with no comparison. Further, the primary frame determination module 30 may compare a static representation vector of a second frame with recently stored static representation vectors of "the static representation DB for the representations associated with the primary frame," and store the vectors.

Further, referring to FIG. 10, a process of determining the primary frame according to representations of a first time (time t−m), a second time (time t), and a third time (time t+k) is to be described. For example, the primary frame determination module 30 may calculate a similarity between a static representation vector of a frame of the first time (time t−m), and primary static representation vectors of a predetermined number (e.g., three frames), which are stored in the static representation DB for the representations associated with the primary frame. Since the similarity between the static representation vector of the frame of the first time (time t−m), and the primary static representation vectors of the predetermined number (e.g., three frames), which are stored in the static representation DB for the representations associated with the primary frame is less than a threshold, the primary frame determination module 30 may determine the frame of the first time (time t−m) as the primary frame. Further, the primary frame determination module 30 may store the static representation vector of the frame of the first time (time t−m) determined as the primary frame in the static representation DB for the representations associated with the primary frame.

According to the exemplary embodiment, the primary frame determination module 30 may calculate a similarity between a static representation vector of a frame of the second time (time t), and primary static representation vectors of a predetermined number (e.g., three frames), which are stored in the static representation DB for the representations associated with the primary frame. As an example, the primary frames of the predetermined number (e.g., three frames), which are stored in the static representation DB for the representations associated with the primary frame may include two primary frames of the first time (time t−m) and before the first time. Meanwhile, since the similarity between the static representation vector of the frame of the second time (time t), and the primary static representation vectors of the predetermined number (e.g., three frames) is high, the primary frame determination module 30 may not determine the frame of the second time (time t) as the primary frame, and not store the frame in the static representation DB for the representations associated with the primary frame.

For example, the primary frame determination module 30 may calculate a similarity between the static representation vector of a frame of the third time (time t+k), and the primary static representation vectors of the predetermined number (e.g., three frames), which are stored in the static representation DB for the representations associated with the primary frame. As an example, the primary frames of the predetermined number (e.g., three frames), which are stored in the static representation DB for the representations associated with the primary frame may include two primary frames of the first time (time t−m) and before the first time. Since the similarity between the static representation vector of the frame of the third time (time t+k), and the primary static representation vectors of the predetermined number (e.g., three frames), which are stored immediately before the third time is less than a threshold, the primary frame determination module 30 may determine the frame of the third time (time t+k) as the primary frame. Further, the primary frame determination module 30 may store the static representation vector of the frame of the third time (time t+k) determined as the primary frame in the static representation DB for the representations associated with the primary frame.

Through the operations described through FIGS. 8 to 10 above, the primary frame determination module 30 may compare a similarity for respective frames included in one video, determine, as the primary frame, the frame which is less than the threshold, and generate "the static representation DB for the representations associated with the primary frame" based on the static representation vector of the determined frame.

According to an exemplary embodiment of the present disclosure, the search DB generation module 40 may include an STT module 41 that performs STT for an audio included the acquired video. The STT module 41 may generate STT text information by performing STT in an interval between multiple primary frames determined with respect to the acquired video. The STT module 41 may generate the STT text information which is an STT result by performing the STT with respect to the audio included in the videos. For STT having a higher performance, the STT module 41 may perform preprocessing (or postprocessing in some exemplary embodiments) such as speech enhancement, noise filtering, voice activation detection (VAD), speaker diarization, etc. Further, the STT module 41 may also perform postprocessing such as error detection, correction, sentence symbol insertion, etc., after the STT. When the subtitle data is included in the acquired video, the STT module 41 may also use the subtitle data instead of the STT text information.

Figure 11:
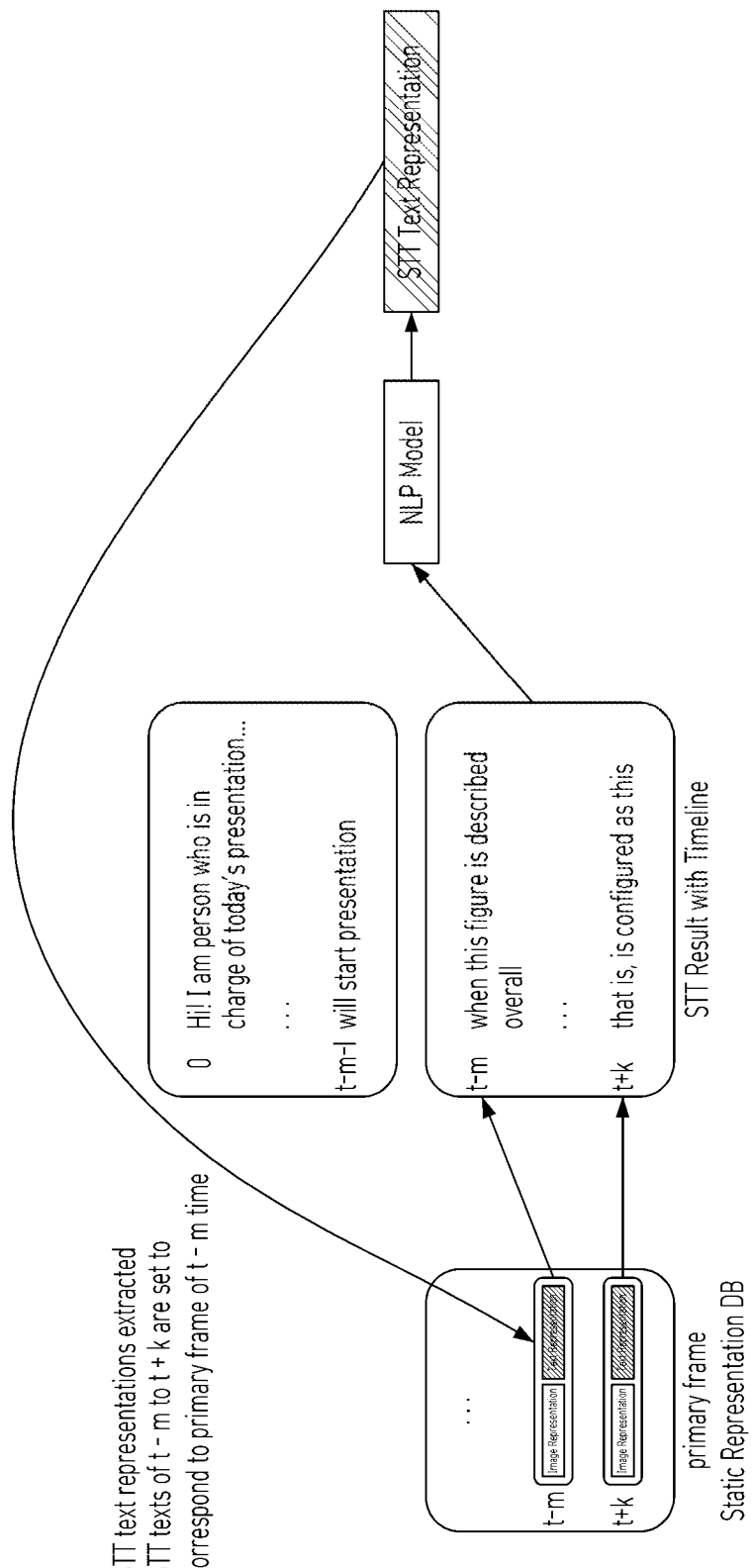
FIG. 11 is a diagram schematically illustrating an operation of extracting a representation for STT text information depending on time information of the primary frame according to an exemplary embodiment of the present disclosure.

FIG. 11 is a diagram schematically illustrating an operation of extracting a representation for STT text information depending on time information of the primary frame according to an exemplary embodiment of the present disclosure.

According to the exemplary embodiment, the search DB generation module 40 may include an STT representation extraction module 42 extracting a representation for the STT text information. The STT representation extraction module 42 may segment the STT text information according to time information of the primary frames recorded in "the static representation DB for the representations associated with the primary frame," and extract the representation for the STT text information as a segmented unit. For example, the STT representation extraction module 42 may be the same module as a text representation extraction module for each frame. As an example, the STT representation extraction module 42 may be the filter, the encoder, or the network model, and may extract a vector, a matrix, or a tensor of a specific dimension. The STT representation extraction module may include CLIP, an NLP model, a transformer encoder, etc.

Meanwhile, since the STT text representation extracted for the STT text information includes meaning information of a text spoken in the "interval" between the primary frames differently from the image representation or the text representation, the STT text representation may include dynamic information (i.e., time-series information) for the interval.

According to an exemplary embodiment of the present disclosure, the static representation DB for the representations associated with the primary frame may include representations of images and representations of texts extracted with respect to respective primary frames, and a representation extracted with respect to STT text information generated in an interval between the multiple primary frames. The search DB generation module 40 may determine the representation extracted with respect to the STT text information generated in the interval between the multiple primary frames as a representation associated with a primary frame temporally preceded among the multiple primary frames.

In other words, the static representation DB for the representations associated with the primary frame may include representations associated with a first primary frame and representations associated with a second primary frame after the first primary frame. Here, the representations associated with the first primary frame may include a representation of a text extracted with respect to the first primary frame, a representation of an image extracted with respect to the first primary frame, and a representation for STT text information extracted with respect to an interval between the first primary frame and the second primary frame. For example, referring to FIG. 11, in the case of the first primary frame (t−m primary frame) and the second primary frame (t+k primary frame), a representation extracted with respect to the STT text information for speech an interval of the first time (t−m) to the second time (t+k) may be treated as a representation corresponding to the frame of the first time (t−m). For example, an STT text representation extracted with respect to rightmost STT text information in FIG. 11 may be stored in response to the first time (t−m) in a final search database of FIG. 12 to be described below.

Figure 12:
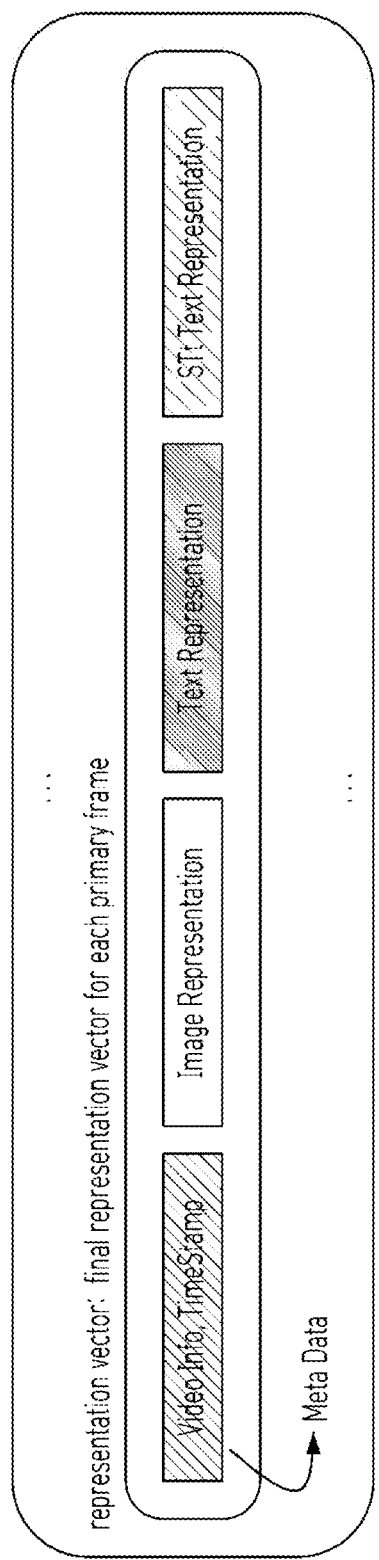
FIG. 12 is a diagram schematically illustrating a final representation vector for each primary frame which is a component of a final search database according to an exemplary embodiment of the present disclosure.
Figure 13:
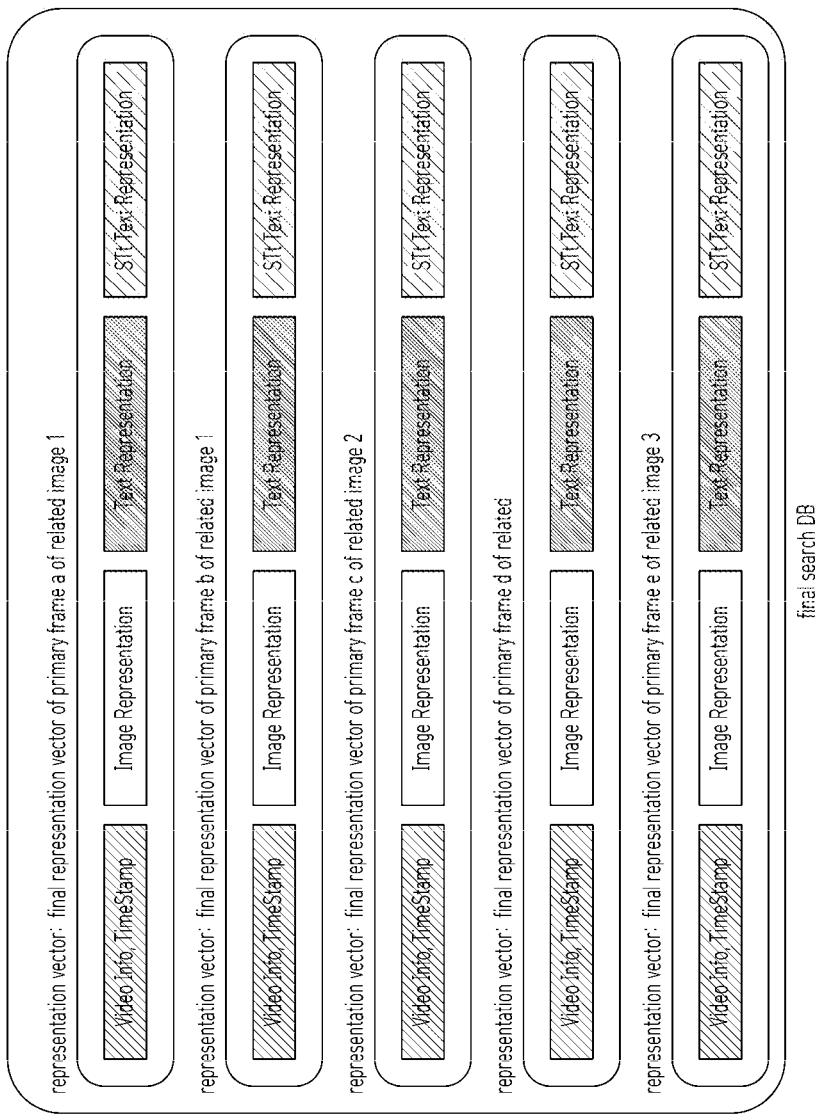
FIG. 13 is a diagram schematically illustrating the final search database according to an exemplary embodiment of the present disclosure.

FIG. 12 is a diagram schematically illustrating a final representation vector for each primary frame which is a component of a final search database according to an exemplary embodiment of the present disclosure, and FIG. 13 is a diagram schematically illustrating the final search database according to an exemplary embodiment of the present disclosure.

According to an exemplary embodiment, the search DB generation module 40 may include a final search DB generation module 43 generating a final search database based on the database for the representations associated with the determined primary frame. As an example, the final search database may include metadata including the video related information, a representation of an image representing static image information included in the primary frame, a representation of a text representing static text information included in the primary frame, and a representation for STT text information including dynamic information for an interval between the primary frames.

In other words, the final search DB generation module 43 may generate the final search database for all related images by using the representation for the STT text information acquired through the STT module 41 and the STT representation extraction module 42, and the metadata including the video related information acquired by the input module 20, in the existing "static representation DB for the representations associated with the primary frame." For example, referring to FIG. 12, the final search DB generation module 43 may generate a final representation vector for each of times zones of the primary frames with respect to all related images. For reference, a final representation vector for one image may be multiple (e.g., when there are multiple primary frames), and the final search database may include finial representation vectors for all related images.

Referring to FIG. 13 according to an exemplary embodiment, the related video (image) may include related image 1, related image 2, and related image 3. A final search database in a case where in related image 1, there are two primary frames A and B, in related image 2, there is one primary frame C, and in related image 3, there are two primary frames D and E may be represented as in FIG. 13. For reference, in the case of the related images, while a first frame is unconditionally determined as the primary frame, and primary frames are determined in the middle, the interval is generated, and in the final search database including the primary frames A, B, C, D, and E of FIG. 13, the first frame may be omitted. For example, in related image 3, a time stamp of primary frame D may be 03:27 and a time stamp of the next primary frame E may be 07:54, and a total length of related image 3 may be 12:30. In this case, an interval corresponding to a first frame (=time stamp 00:00) of related image 3 may be 00:00 to 03:27, an interval corresponding to primary frame D (=time stamp 03:27) of related image 3 may be 03:27 to 07:54, and an interval corresponding to primary frame E (=time stamp 07:54) of related image 3 may be 07:54 to 12:30. Based thereon, "the video search method" is to be described below.

Figure 14:
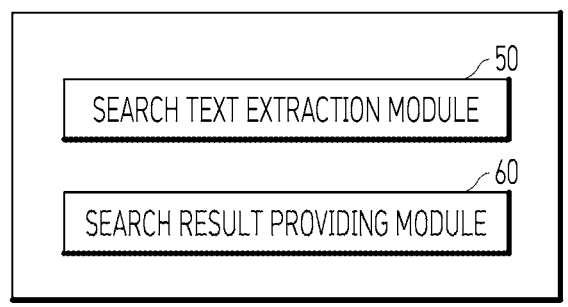
FIG. 14 is a block diagram of multiple modules for searching a video according to an exemplary embodiment of the present disclosure.

FIG. 14 is a block diagram of multiple modules for searching a video according to an exemplary embodiment of the present disclosure.

According to an exemplary embodiment of the present disclosure, the computing device 100 may include a search text extraction module 50 and a search result providing module 60. Meanwhile, multiple modules that may be included in the computing device 100 may be controlled by the processor 110 or implemented by an operation of the processor 110. Additionally, in relation to video searching, modules that may be included in the computing device 100 are not limited to the multiple modules described above, and may include additional modules. Hereinafter, exemplary multiple modules for searching the video will be described in more detail.

According to an exemplary embodiment of the present disclosure, the search text extraction module 50 may extract a representation of search information of an acquired video. The search information may include text information acquired through a user terminal. The search text extraction module 50 may be a model used in the text representation extraction module 32 and the STT representation extraction module 42 described above. In other words, the search text extraction module 50 may be the filter, the encoder, or the network model, and may extract a vector, a matrix, or a tensor of a specific dimension. Further, the search text extraction module 50 may include CLIP, an NLP model, a transformer encoder, etc.

In FIG. 14 and an example described after FIG. 14, a case where the text is received as the input is described, but in some exemplary embodiments, an input may be an image form, and in this case, a search image extraction module may be used instead of the search text extraction module 50. The search image extraction module may be a model used in the image representation extraction module 31 described above. In other words, the search image extraction module may be the filter, the encoder, or the network model, and may extract a vector, a matrix, or a tensor of a specific dimension. Further, the search image extraction module may include the CLIP, the NLP model, the transformer encoder, etc.

Figure 15:
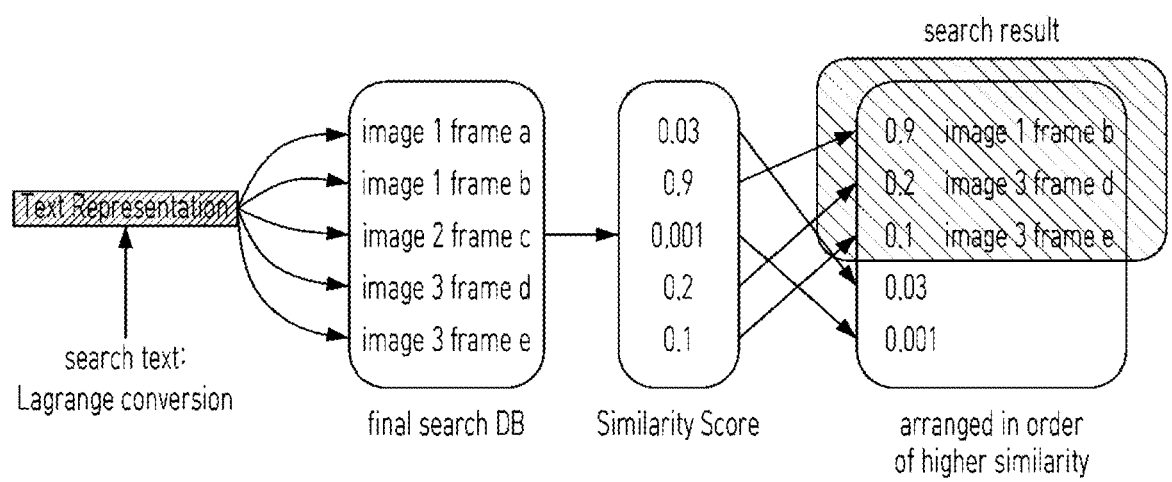
FIG. 15 is a diagram describing an operation of determining higher results having a high similarity by comparing a search text representation and the final search DB according to an exemplary embodiment of the present disclosure.
Figures 16, 17:
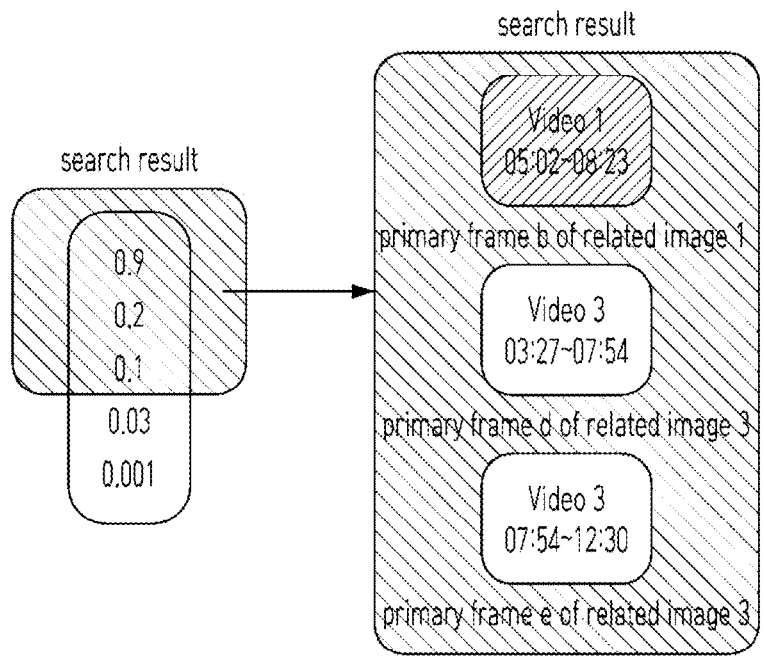
FIG. 16 is a diagram describing an operation of determining several primary frames having a high similarity among related image primary frames depending on a final search result according to an exemplary embodiment of the present disclosure.
FIG. 17 is a diagram describing an operation of providing a time stamp with a search text among STT text information of an interval for a target frame when a user selects at least any one of target frame candidates according to an exemplary embodiment of the present disclosure.

FIG. 15 is a diagram describing an operation of determining higher results having a high similarity by comparing a search text representation and the final search DB according to an exemplary embodiment of the present disclosure, FIG. 16 is a diagram describing an operation of determining several primary frames having a high similarity among related image primary frames depending on a final search result according to an exemplary embodiment of the present disclosure, and FIG. 17 is a diagram describing an operation of providing a time stamp with a search text among STT text information of an interval for a target frame when a user selects at least any one of target frame candidates according to an exemplary embodiment of the present disclosure.

According to an exemplary embodiment of the present disclosure, the search result providing module 60 may determine a primary frame associated with the search information based on a comparison between a representation extracted with respect to the search information and representations of multiple primary frames determined with respect to the video. Here, the representations of the respective primary frames may include a representation extracted with respect to an image of each primary frame, a representation extracted with respect to a text of each primary frame, and a representation for STT text information associated with each primary frame. In this case, the representation of the STT text information associated with each primary frame may include a representation of STT text information for an interval between each primary frame and the next primary frame.

According to the exemplary embodiment, the search result providing module 60 may provide information on a primary frame associated with search information. The information on the primary frame associated with the search information may include video information corresponding to an interval between the associated primary frame and a next primary frame of the associated primary frame. As an example, a representation extracted with respect to the search information by the search text extraction module 50 is compared with the final search database to calculate a similarity. When the user searches the video with the image, an image representation extracted from a search image by the search image extraction module is compared with the final search database to calculate a similarity. Further, the search result providing module 60 may provide, to the user terminal, information on primary frames of which similarity is equal to or more than a threshold by arranging the primary frames in the order of a higher similarity.

For example, referring to FIG. 15, when the search information for the video is "LaGrange conversion," the search result providing module 60 may calculate a similarity in a relationship between a text representation vector for the search information extracted by the search text extraction module 50 and final representation vectors for each of the primary frames of the related images stored in the final search database. As the similarity, the cosine similarity (see Equation 1) may be used similarly to various representation extraction modules described above, but the present disclosure is not limited thereto. The search result providing module 60 may extract a similarity calculation result as 0.03 with respect to image 1—frame A, 0.9 with respect to image 1—frame B, 0.001 with respect to image 2—frame C, 0.2 with respect to image 3—frame D, and 0.1 with respect to image 3—frame E, as a result of performing a similarity calculation for the search information ("LaGrange conversion") and each of the final representation vectors for each primary frame included in a final database. Thereafter, the search result providing module 60 may provide, to the user terminal, information on primary frames in the order of image 1—frame B, image 3—frame D, and image 3—frame E by arranging the primary frames in the order of a higher similarity.

Further, as illustrated in FIG. 16, the search result providing module 60 may provide a primary frame (hereinafter, referred to as a target frame candidate) having a high similarity among related image primary frames according to a final search result. The search result providing module 60 may provide target frame candidates to the user terminal. Further, when the user determines one (target frame) among the target frame candidates, the search result providing module 60 may provide a whole image corresponding to the target frame, and a corresponding time stamp. According to the exemplary embodiment, as illustrated in FIG. 17, within an interval corresponding to the target frame (e.g., an interval between a target frame and a next primary frame of the corresponding related image), a time stamp in a part where there is a true search text may be pinpointed by using an STT result text, and provided to the user. In other words, when the user selects frame B of related image 1 among target frame candidates B, D, and E, the search result providing module 60 may pinpoint and provide a time stamp (06:24) with search information among STT text information of an interval (05:02 to 08:23) corresponding to target frame B.

According to an exemplary embodiment of the present disclosure, the computing device 100 may i) directly determine a related image and perform video searching. For example, in a case where Action Power directly operates a video platform such as YouTube, the case may correspond to the exemplary embodiment. When the computing device 100 generates and constructs the final search database based on the database for the representations associated with the primary frame immediately with respect to an image uploaded to the video platform, the computing device 100 may perform, when inputting the search information (search text), searching quickly based on the input search information. On the contrary, in a case where the platform is not directly operated, when the search information (search text) is input, the related image may be primarily determined by using the third party (e.g., Google, YouTube, etc.), and the computing device 100 may construct the final search database based on the database for the representations associated with the primary frame with respect to the related images.

Further, the computing device 100 may ii) perform video searching even with respect to a case where the related image is already determined. For example, a case where a service is provided by B2B, in other words, a case where the related image is provided from a B2B customer (e.g., an Internet lecture provider such as Mega Study, etc.) may correspond to the exemplary embodiment. According to the exemplary embodiment, all images may be acquired as the related images from a terminal or a server of the customer (e.g., the Internet lecture provider such as Mega Study, etc.) in advance, and according to another exemplary embodiment, when the user searches a text, the B2B customer (e.g., the Internet lecture provider such as Mega Study, etc.) may primarily filter the text and determine the related image, and the computing device 100 may construct the final search database based on the database for the representations associated with the primary frame, and perform searching with respect to the determined related images.

According to an exemplary embodiment of the present disclosure, the video search method described above may be used in a broadcasting station. For example, there is a case where past materials are used in the process of editing an entertainment image in a broadcasting station, and in this case, it is difficult to find a video to be used at once, so PDs should perform a process of checking the past materials directly. As an example, when a specific scene (e.g., a scene in which Henri heads a water ball in Infinite Challenge) is found with respect to past videos, the "video search method" may be used. The computing device 100 may construct the final search database based on the database for the representations associated with the primary frame using all images of the corresponding program (e.g., Infinite Challenge) as the related images. When the computing device 100 acquires the "scene in which Henri heads the water ball" as the search information, the computing device 100 may quickly provide the corresponding scene of the corresponding image in the corresponding program (e.g., Infinite Challenge) through the constructed final search database.

According to an exemplary embodiment of the present disclosure, the video search method described above may also be used in natural documentary search. When there are few lines like natural documentaries, the search may be more difficult by a current text-centered video search mode. Since the computing device 100 also uses the image representation, the image representation may also be used for searching an image not including a spoken speech. For example, when "a scene in which a lion hunts a deer" is desired to be searched in a National Geographic image, the final search database may be constructed by using National Geographic images as the related images, and the desired scene may be searched.

According to an exemplary embodiment of the present disclosure, the computing device 100 may also be used in "video summary" through the operations of the database construction method using the video and the video search method described above. For example, the computing device 100 may perform, based on a primary frame timestamp, the video summary by giving a weight to an STT result of a predetermined interval around of the primary frame timestamp.

Figure 18:
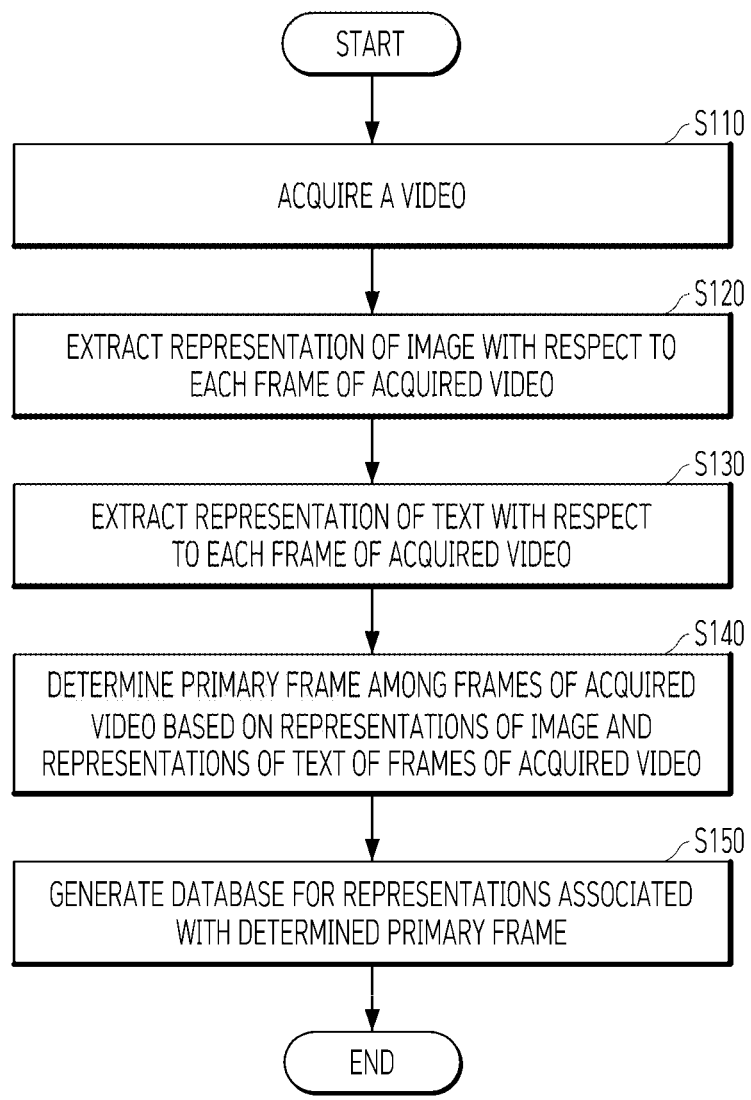
FIG. 18 is a flowchart of a method for constructing a database using a video according to an exemplary embodiment of the present disclosure.

FIG. 18 is a flowchart of a method for constructing a database using a video according to an exemplary embodiment of the present disclosure.

The database construction method using the video illustrated in FIG. 18 may be performed by the computing device 100 described above. Hereinafter, in spite of contents omitted below, the contents described regarding the computing device 100 may also be similarly applied to a description of the database construction method using the video.

Referring to FIG. 18, the database construction method using the video according to an exemplary embodiment of the present disclosure may include a step of acquiring the video (S110), a step of extracting a representation of an image with respect to each frame of the acquired video (S120), a step of extracting a representation of a text with respect to each frame of the acquired video (S130), a step of determining a primary frame among the frames of the acquired video based on representations of an image and representations of a text of the frames of the acquired video (S140), and a step of generating a database for representations associated with the determined primary frame (S150).

Step S110 is a step of acquiring the video.

Step S120 is a step of extracting the representation of the image with respect to each frame of the acquired video.

Step S130 is a step of extracting the representation of the text with respect to each frame of the acquired video. Step S130 above may include a step of extracting the representation of the text based on at least one of subtitle information for each frame or text information acquired by OCR for the image of each frame.

Step S140 is a step of determining the primary frame among the frames of the acquired video based on the representations of the image and the representations of the text of the frames of the acquired video.

Step S150 is a step of generating the database for the representations associated with the determined primary frame. The database for the representations associated with the determined primary frame may include representations of images and representations of texts extracted with respect to respective primary frames, and a representation extracted with respect to STT text information generated in an interval between the multiple primary frames.

According to an exemplary embodiment of the present disclosure, the method may further include a step of generating the STT text information by performing STT in an interval between multiple primary frames determined with respect to the acquired video; and a step of extracting a representation for the STT text information.

Further, the method may include a step of generating a final search database based on the database for the representations associated with the determined primary frame. Here, the final search database may include metadata including the video related information, a representation of an image representing static image information included in the primary frame, a representation of a text representing static text information included in the primary frame, and a representation for STT text information including dynamic information for an interval between the primary frames.

Figure 19:
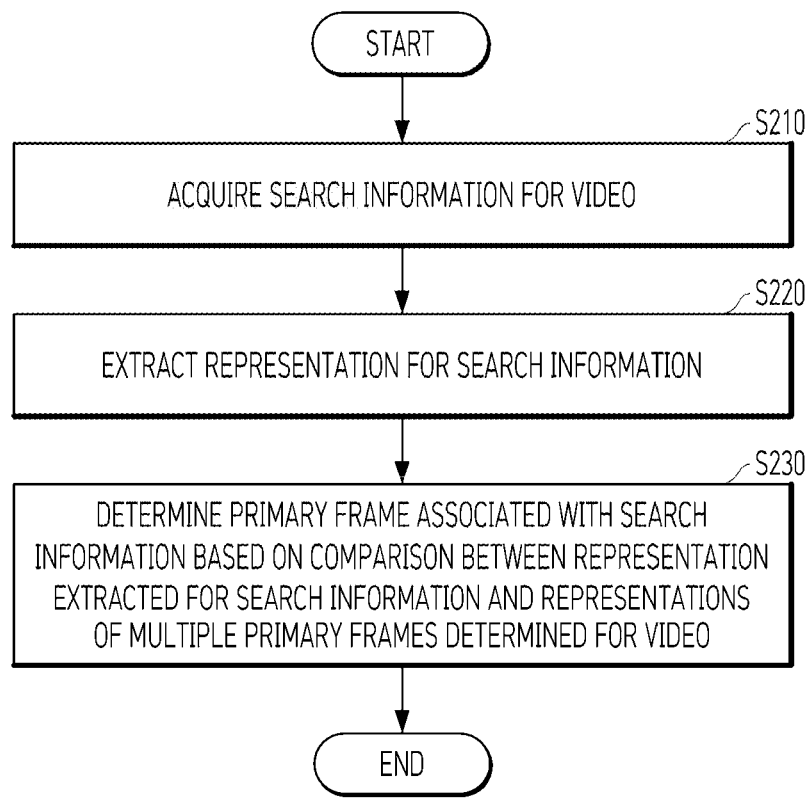
FIG. 19 is a flowchart of a video search method according to an exemplary embodiment of the present disclosure.

FIG. 19 is a flowchart of a video search method according to an exemplary embodiment of the present disclosure.

The video search method illustrated in FIG. 19 may be performed by the computing device 100 described above. Hereinafter, in spite of contents omitted below, the contents described regarding the computing device 100 may also be similarly applied to a description of the video search method.

Referring to FIG. 19, the video search method according to an exemplary embodiment of the present disclosure may include a step of acquiring search information for a video (S210), a step of extracting a representation for the search information (S220), and a step of determining a primary frame associated with the search information based on a comparison between the representation extracted for the search information and representations of multiple primary frames determined for the video (S230).

Step S210 is a step of acquiring the search information for the video. According to the exemplary embodiment, the search information for the video may be a text or an image.

Step S220 is a step of extracting the representation for the search information.

Step S230 is a step of determining the primary frame associated with the search information based on the comparison between the representation extracted for the search information and the representations of multiple primary frames determined for the video. Here, the representations of the respective primary frames may include a representation extracted with respect to an image of each primary frame, and a representation extracted with respect to a text of each primary frame.

According to an exemplary embodiment of the present disclosure, in the method, the representations of the respective primary frames may further include a representation for STT text information associated with the respective primary frames. Here, the representation of the STT text information associated with the respective primary frames may include a representation of STT text information for an interval between each primary frame and the next primary frame.

Further, the method may further include a step of providing information on the primary frame associated with the search information, and the information on the primary frame associated with the search information may include video information corresponding to an interval between the associated primary frame and a next primary frame of the associated primary frame.

Figure 20:
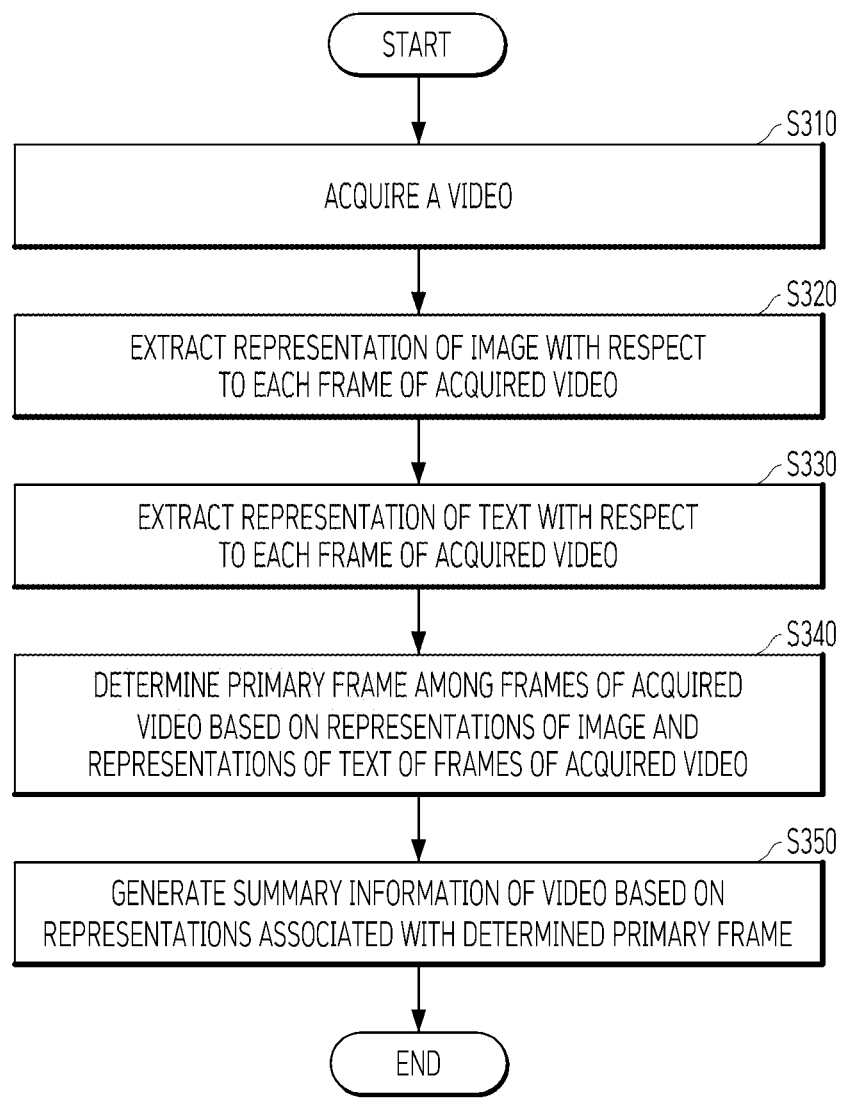
FIG. 20 is a flowchart of a video summary method according to an exemplary embodiment of the present disclosure.

FIG. 20 is a flowchart of a video summary method according to an exemplary embodiment of the present disclosure.

The video summary method illustrated in FIG. 20 may be performed by the computing device 100 described above. Hereinafter, in spite of contents omitted below, the contents described regarding the computing device 100 may also be similarly applied to a description of the video summary method.

Referring to FIG. 20, the method for summarizing a video according to an exemplary embodiment of the present disclosure may include a step of acquiring the video (S310), a step of extracting a representation of an image with respect to each frame of the acquired video (S320), a step of extracting a representation of a text with respect to each frame of the acquired video (S330), a step of determining a primary frame among the frames of the acquired video based on representations of an image and representations of a text of the frames of the acquired video (S340), and a step of generating summary information of the video based on representations associated with the determined primary frame (S350).

Step S310 is a step of acquiring the video.

Step S320 is a step of extracting the representation of the image with respect to each frame of the acquired video.

Step S330 is a step of extracting the representation of the text with respect to each frame of the acquired video.

Step S340 is a step of determining the primary frame among the frames of the acquired video based on the representations of the image and the representations of the text of the frames of the acquired video.

Step S350 is a step of generating the summary information of the video based on the representations associated with the determined primary frame.

In the above description, steps S110 to S150, steps S210 to S230, and step S310 to S350 may further be divided into additional steps, or combined as fewer steps according to an implementation example of the present disclosure. Further, some steps may also be omitted as necessary, and an order between the steps may be changed.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes." The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 21:
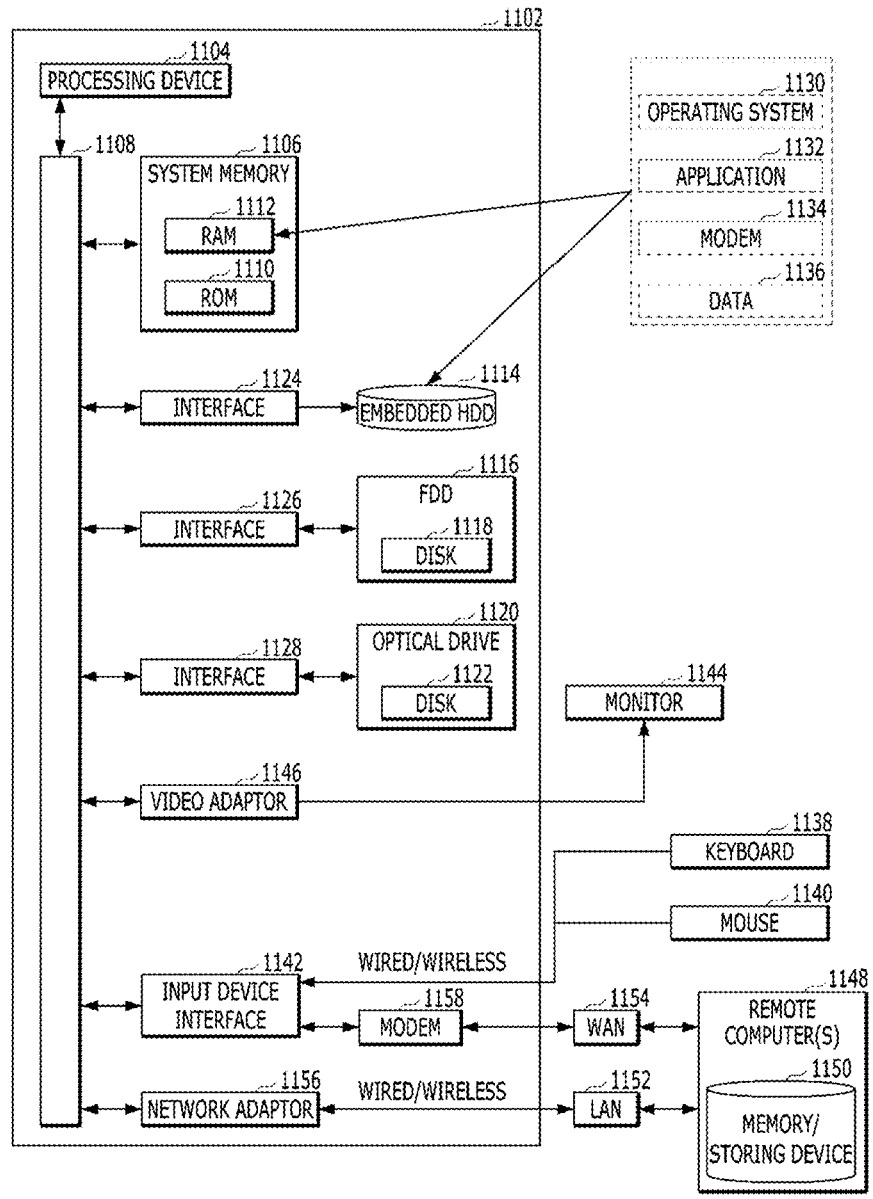
FIG. 21 is a simple and normal schematic view of an exemplary computing environment in which the embodiments of the present disclosure may be implemented.

FIG. 21 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

The invention claimed is:

1. A method for constructing a database using a video, the method being performed by a computing device, the method comprising:
   acquiring the video;
   extracting a representation vector of an image including information on patterns related to the image with respect to each frame of the acquired video;
   extracting a representation vector of a text including information on patterns related to the text with respect to the each frame of the acquired video;
   representing the each frame of the acquired video as a static representation vector including the representation vector of the image and the representation vector of the text;
   determining a primary frame among frames of the acquired video based on a similarity between static representation vectors of the frames of the acquired video;
   generating a database for representation vectors associated with the determined primary frame;
   generating Speech To Text (STT) text information by performing STT in an interval between multiple primary frames determined with respect to the acquired video; and
   extracting a representation vector for the STT text information,
   wherein the database for the representation vectors associated with the determined primary frame includes:
   a representation vector of an image and a representation vector of a text extracted with respect to respective primary frames, and
   the representation vector extracted with respect to the STT text information generated in the interval between the multiple primary frames.

2. The method of claim 1, wherein at least one of a model for extracting the representation vector of the image or a model for extracting the representation vector of the text is a model trained based on image-text contrastive training.

3. The method of claim 1, wherein the generating of the database for the representation vectors associated with the determined primary frame includes:
   determining the representation vector extracted with respect to the STT text information generated in the interval between the multiple primary frames as a representation vector associated with a primary frame temporally preceded among the multiple primary frames.

4. The method of claim 3, wherein the database for the representation vectors associated with the determined primary frame includes:
   representation vectors associated with a first primary frame, and representation vectors associated with a second primary frame after the first primary frame, and wherein the representation vectors associated with the first primary frame include:

a representation vector of a text extracted with respect to the first primary frame, a representation vector of an image extracted with respect to the first primary frame, and a representation vector for STT text information extracted with respect to an interval between the first primary frame and the second primary frame.

5. The method of claim 1, further comprising: generating a final search database based on the database for the representation vectors associated with the determined primary frame.

6. The method of claim 5, wherein the final search database includes metadata including video related information, a representation vector of an image representing static image information included in the primary frame, a representation vector of a text representing static text information included in the primary frame, and a representation vector for STT text information including dynamic information for the interval between the primary frames.

7. The method of claim 1, wherein the extracting of the representation vector of the text with respect to the each frame of the acquired video includes:

extracting the representation vector of the text based on at least one of subtitle information for the each frame or text information acquired by Optical Character Recognition for the image of the each frame.

8. The method of claim 1, wherein the determining of the primary frame among the frames of the acquired video includes:

determining, based on calculation of similarities between a static representation vector of one or more primary frames most recently determined according to a flow of time, and a static representation vector of a candidate frame, the candidate frame as the primary frame.

9. A video search method performed by a computing device, the method comprising:

acquiring search information for a video;

extracting a representation vector for the search information; and determining a primary frame associated with the search information based on a comparison between the representation vector extracted for the search information and representation vectors of multiple primary frames determined for the video, wherein the representation vectors of the respective primary frames include a representation vector extracted with respect to an image of each primary frame, and a representation vector extracted with respect to a text of the each primary frame, wherein the representation vectors of the respective primary frames further include a representation vector for Speech To Text (STT) text information associated with the respective primary frames, wherein the representation vector of the STT text information associated with the respective primary frames includes a representation vector of STT text information for an interval between each primary frame and the next primary frame.

10. The method of claim 9, further comprising: providing information on the primary frame associated with the search information, wherein the information on the primary frame associated with the search information includes video information corresponding to an interval between the associated primary frame and a next primary frame of the associated primary frame.

11. The method of claim 10, wherein the providing of the information on the primary frame associated with the search information includes:

providing a timestamp corresponding to the search information based on the STT text information.

12. A method for summarizing a video, the method being performed by a computing device, the method comprising:

acquiring the video;

extracting a representation vector of an image with respect to each frame of the acquired video;

extracting a representation vector of a text with respect to the each frame of the acquired video;

determining a primary frame among frames of the acquired video based on representation vectors of images and representation vectors of texts of the frames of the acquired video;

generating Speech To Text (STT) text information by performing STT in an interval between multiple primary frames determined with respect to the acquired video;

extracting the representation vectors for the STT text information; and generating summary information of the video based on the representation vectors associated with the determined primary frame, wherein the extracting of the representation vector of the text with respect to the each frame of the acquired video includes:

extracting the representation vectors of the text based on at least one of subtitle information for the each frame or text information acquired by Optical Character Recognition for the image of the each frame.

13. The method of claim 12, wherein at least one of a model for extracting the representation vector of the image or a model for extracting the representation vector of the text is a model trained based on image-text contrastive training.

14. The method of claim 12, wherein the each frame of the acquired video is represented as a static representation vector including an image representation and a text representation, and wherein the determining of the primary frame among the frames of the acquired video includes:

determining, based on calculation of similarities between a static representation vector of one or more primary frames most recently determined according to a flow of time, and a static representation vector of a candidate frame, the candidate frame as the primary frame.

* * * * *